US006256857B1

(12) United States Patent
Roseliep

(10) Patent No.: US 6,256,857 B1
(45) Date of Patent: *Jul. 10, 2001

(54) TOOL HOLDER

(75) Inventor: Robert E. Roseliep, Grosse Pointe, MI (US)

(73) Assignee: Utica Enterprises Inc., Shelby, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,886

(22) Filed: Mar. 8, 1999

Related U.S. Application Data

(62) Division of application No. 08/786,429, filed on Jan. 21, 1997, now Pat. No. 5,878,642.

(51) Int. Cl.[7] .................................................... B23D 37/00

(52) U.S. Cl. ........................ 29/428; 76/107.1; 83/698.91; 409/259; 409/287

(58) Field of Search ............................ 83/698.91, 698.71, 83/698.41, 690, 164; 72/467; 409/287, 259, 304, 345; 76/107.1, 101.1; 29/428

(56) References Cited

U.S. PATENT DOCUMENTS

| | | | |
|---|---|---|---|
| 329,285 | * | 10/1885 | Dalzell . |
| 3,079,824 | * | 3/1963 | Schott . |
| 3,358,542 | * | 12/1967 | Murray et al. . |
| 3,752,028 | * | 8/1973 | Waizmann et al. . |
| 3,779,122 | * | 12/1973 | Sawvell . |
| 4,131,047 | * | 12/1978 | Schriber et al. . |
| 4,287,749 | * | 9/1981 | Bachrach et al. . |
| 4,442,575 | * | 4/1984 | Hulin et al. . |
| 4,552,050 | * | 11/1985 | Grefe . |
| 5,613,693 | * | 3/1997 | Ramunas . |
| 5,782,130 | * | 7/1998 | Sawdon . |
| 5,992,285 | * | 11/1999 | Talarico . |

OTHER PUBLICATIONS

Research Disclosure S9234, Oct. 1979.*

* cited by examiner

*Primary Examiner*—Kenneth E. Peterson
(74) *Attorney, Agent, or Firm*—Vanophem Meehan & Vanophem, P.C.

(57) ABSTRACT

A tool retention apparatus for retaining a cutting tool in a tool holder which has a wedged shaped securing arrangement to hold the cutting tool against a pair of precision ground supports. The securing member provides both a vertical securing force and a radial location of the cutting tool to facilitate installation and removal of the cutting tool from a machine.

9 Claims, 3 Drawing Sheets

TOOL HOLDER

This Application is a divisional of Ser. No. 08/786,429, filed Jan. 21, 1997, now U.S. Pat. No. 5,878,642.

BACKGROUND OF THE INVENTION

1. Field of the Invention

The present invention relates generally to manufacturing a form on the end of a shaft, i.e., blind spline tools mounted in tool holders, and more specifically to securing punches and dies to tool holders in individual or multiple tool arrangements.

2. Description of the Prior Art

Blind spline tools, i.e. punches and/or dies, individually or in multiple tool arrangements, have traditionally been held in position by precision grinding the major diameter or minor diameter of the cutting tool to very precise tolerances and mounting the cutting tool into tool holders having precision bores or pilots. Radial location is generally established by using a precision "V" slot or keyway. The "V" or keyway is manufactured in relation to the profile of the cutting tool and positioned central to the precision ground inside or outside diameter of the cutting tool. Most tools are retained by socket head cap screws threaded into the base of the tool holder. FIG. 6 shows such a prior art arrangement. A cylindrical cutting tool 100 is shown having a precision ground outer diameter 102 and an inner form ground master spline 104 which defines the cutting surface. The cutting tool 100 is secured to a cutting tool mounting block or holder 106 by securing bolts 108. The tool holder has a cylindrical cavity 109 with a diameter closely toleranced to the outer diameter 102 of the cutting tool 100. While the securing bolts 108 establish a location in a plane transverse to the axis of the cutting tool 100, the radial position of the cutting tool 100 still needs to be accurately positioned. For this purpose a "V" notch 110 is typically used to provide such radial positioning. A securing member or "V" locator 112 is formed on the tool holder 106 so that the "V" notch 110 in the cutting tool mounts therein to provide the radial position of the cutting tool 100 with respect to the tool holder 106.

To accommodate for the loss of the location in the transverse plane of the cutting tool when the cutter is sharpened by grinding the top of the cutting tool 100, a riser shim (not shown) is mounted adjacent to the bottom of the tool between the cutting tool and the tool holder by cap screws 107. This riser shim, which in thickness represents the metal removed from the top in sharpening the cutting tool, is usually attached to the bottom of the cutting tool after it is sharpened. Clearance holes for the screw heads which retain the riser shims to the cutting tool are provided in the tool holder.

To prevent a setup man from mounting the wrong cutting tool 100 in the wrong mounting block 106, a selective interference is provided in the cutting tool mounting block cavity. This selective interference is most commonly accomplished by having a dowel pin 105 located in and protruding from the top face of the tool holder 106 which mates with a corresponding hole in the bottom of the cutting tool 100 in such a manner as to interfere with all but the correct cutting tool. The correct cutting tool will have a clearance hole in a predetermined location with respect to the "V" notch and the mounting hole pattern to receive the dowel pin protruding from the top face of the tool holder and therefore only the correct cutting tool will fit in a specific cavity in the tool holder.

To remove the prior art cutting tool 100 from its tool holder 106 it is required that the securing bolt 108 be removed, and the securing member 112 removed or retracted from the "V" notch 110. Often the prior art cutting tool requires the use of jack screws to remove or lift the cutting tool 100 from the cavity in the precision tool holder 106. The jack screws are required since the cylindrical cavity 109 in the tool holder 106 is precision ground to very close tolerances to match the outer diameter 102 of the cutting tool 100. The need for the various accurate positioning surfaces and associated retaining devices results in an expensive cutting tool which is time consuming to remove from its tool holder. Accordingly, what is needed is a cutting tool which is inexpensive to manufacture and easy to install and/or remove from its tool holder as well as which offers more accuracy for positioning the cutting tool on the tool holder.

SUMMARY OF THE INVENTION

According to the present invention there is provided a blind spline cutting tool having two precision planar or flat faces which are machined in the periphery of the cutting tool along an outer edge of the cutting tool in spaced relation to each other and perpendicular to the bottom face of the cutting tool. A third planar or flat face is also machined in the periphery of the cutting tool along the outer edge opposite from the two precision planar faces. The third planar face is at an acute angle with respect to the bottom face of the cutting tool such that when contacted by a securing device, such as a wedge, an effective force will be generated so as to force the cutting tool firmly against the two precision planar faces and a base on the tool holder in order to accurately mount the cutting tool in the tool holder. In a preferred embodiment, the base or tool holder upon which the cutting tool is mounted has complementary riser blocks establishing abutment mounting faces in opposing spaced relationship. The planar face opposing the two precision planar faces on the cutting tool is spaced a predetermined distance from the complementary riser block mounted on the base or holder. When the cutting tool is mounted to the tool holder the two precision planar faces of the cutting tool are forced against mounting faces of the complementary riser blocks on the tool holder, by the use of a wedge lock mounted between the third planar face of the cutting tool and its complementary riser block. The wedge lock cooperates with the third planar face and the associated riser block to secure the cutting tool to its tool holder and prevents the cutting tool from pulling away from the base of the tool holder. This arrangement provides for radial alignment of the cutting tool as well as secures the cutting tool to its tool holder thereby eliminating the need for a "V" notch for establishing a radial position.

To accommodate resharpening of the cutting tool, riser shims are used to provide an adjustment to the height of the cutting tool. The riser shims are bolted to the bottom of the cutting tool. "Fool proofing" in the present invention is accomplished by positioning the riser shim holes in a different radial relationship to the precision planar faces on each cutter in a set and providing clearance holes in the tool holder in a pattern which assures that only the proper cutting tool with the proper shim is bolted in the corresponding tool holder.

Accordingly, it is an object of the present invention to provide a cutting tool retention device that provides for accurate positioning of a cutting tool by eliminating any clearance between the cutting tool and the tool holder.

It is a further object of the invention to provide a cutting tool retention device wherein the positioning of a cutting tool has improved accuracy in a radial direction.

It is a still further object of the present invention to provide a cutting tool retention device from which a cutting tool is easy to remove by backing off a single locking device.

It is another object of the invention to provide a cutting tool retention device for securing a cutting tool that requires only a single retaining device in an effort to reduce the time and effort required to change tools.

It is yet another object of the invention to provide a cutting tool retention device for a cutting tool that is inexpensive to manufacture.

It is an even further object of the invention to provide a blind spline tool retention device for a blind spline cutting tool that allows existing prior art cutting tools with screw holes to be reworked to conform to the new inventive cutting tool.

It is yet another object of the present invention to provide a securing apparatus for a blind spline cutting tool that provides a fool proofing mounting arrangement for both the cutting tool as well as its associated riser shim.

Other objects and advantages of the invention will be more apparent after a reading of the following detailed description taken in conjunction with the drawings provided.

DETAILED DESCRIPTION OF THE PREFERRED EMBODIMENT

As discussed hereinabove, the prior art tool holder consisted of a precision ground circular cavity into which was mounted a precision ground cylindrical cutting tool. As is clear to one skilled in the art, it is impossible to have zero tolerance between the outside diameter (O.D.) of the cutting tool and the inside diameter (I.D.) of the cavity in the tool holder. Therefore, this type of retainer system inherently has some built-in error when the radial wedge or key is moved into the "V" notch or key slot until surface-to-surface contact is obtained by the complementary O.D. of the cutting tool and I.D. of the cavity. The retention arrangement of the present invention eliminates the above described built-in error as is hereinafter discussed.

Figure 1:
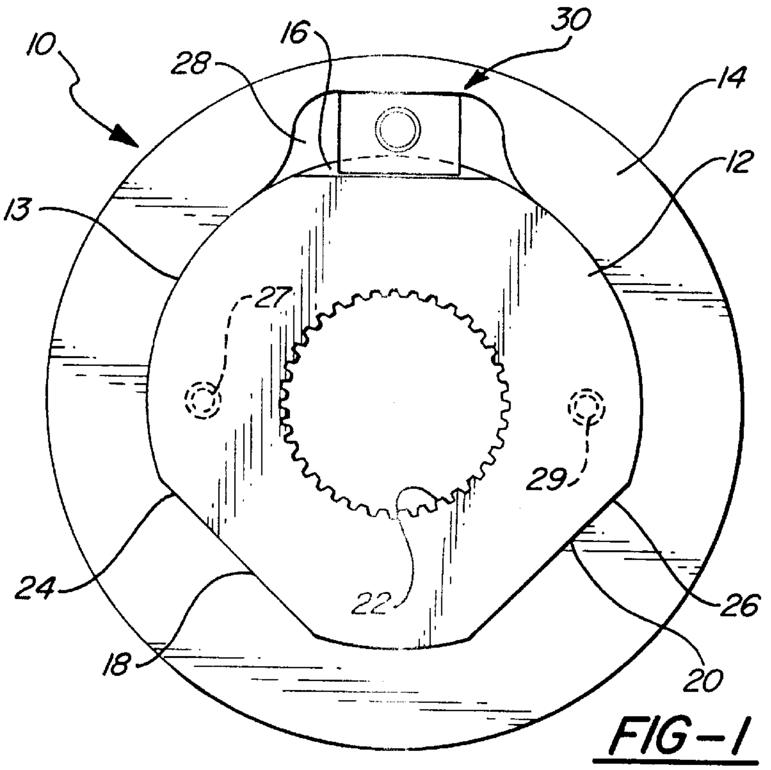
FIG. 1 is a partial plan view of the retention apparatus of an embodiment of the present invention.

With reference to FIG. 1, there is shown a plan view of a cutting tool retention arrangement 10 according to an embodiment of the present invention. The cutting tool retention arrangement 10 includes a cutting tool 12 and a tool holder 14. The cutting tool 12 has a peripheral edge 13 which is interrupted by three flat faces 16, 18, and 20. The flat or planar faces 18 and 20 are preferably parallel to the central axis of a spline form cutting edge 22. However, such an arrangement is not essential for the retention system to operate according to the teachings herein. The flat face 16 is at an acute angle to a line parallel to the central axis of the spline form cutting edge 22 for a purpose to be discussed hereinafter. The spline form cutting edge 22 is shaped to the form of the impression desired to be cut by the cutting tool. The drawings illustrate a spline; however, it is understood that any desired form may be used as a cutting edge.

Figure 4:
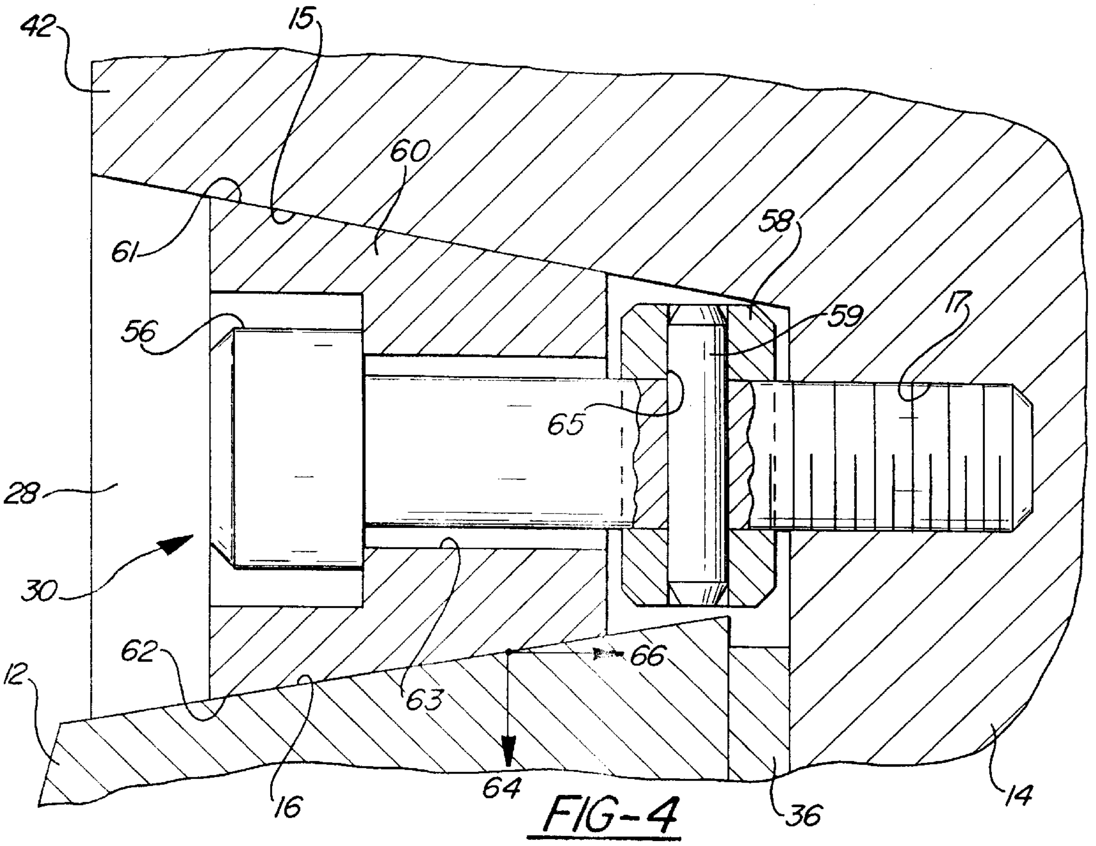
FIG. 4 is a break-away cross-sectional view of the securing system shown in FIGS. 2 and 3.

The beveled planar face 16 in the cutting tool 12 is formed at an acute angle to the peripheral edge of the cutting tool; which can vary, but which is, preferably, approximately 15°. A securing mechanism 30 in the form of a wedge lock arrangement, as hereinafter described with reference to FIG. 4, is mounted in a cavity 28 and makes contact with the beveled flat face 16. The securing mechanism when mounted to the tool holder 14 locks the cutting tool 12 to the tool holder in two degrees of orientation. The first degree of securing is radial securing by forcing the flat faces 18 and 20 of the cutting tool 12 into flat faces 24 and 26 in the cavity of the tool holder 14. The second degree of securing is provided in a downward direction toward the tool holder 14 as a result of the wedging action of the securing mechanism 30. According to the present invention, the flat face 18 and the flat face 20 of the cutting tool 12 are precision ground, as are the flat faces 24 and 26 of the tool holder 14. The ground face 24 and the ground face 26 directly contact the flat face 18 and the flat face 20 of the cutting tool 12 as the securing mechanism 30 is tightened. Since the flat face 18, the flat face 20, the flat face 24, and the flat face 26 are all precision ground faces, precise radial positioning of the cutting tool 12 on its tool holder 14 is accomplished. It should be appreciated by those skilled in the art that the closer the tolerance obtained in manufacturing the flat faces 18 and 20 as well as the ground flat faces 24 and 26, the higher the accuracy of the radial positioning of the cutting tool 12. It is, therefore, desired that the faces 18 and 20, 24 and 26 be ground to the highest tolerances economically permissible.

Figure 5:
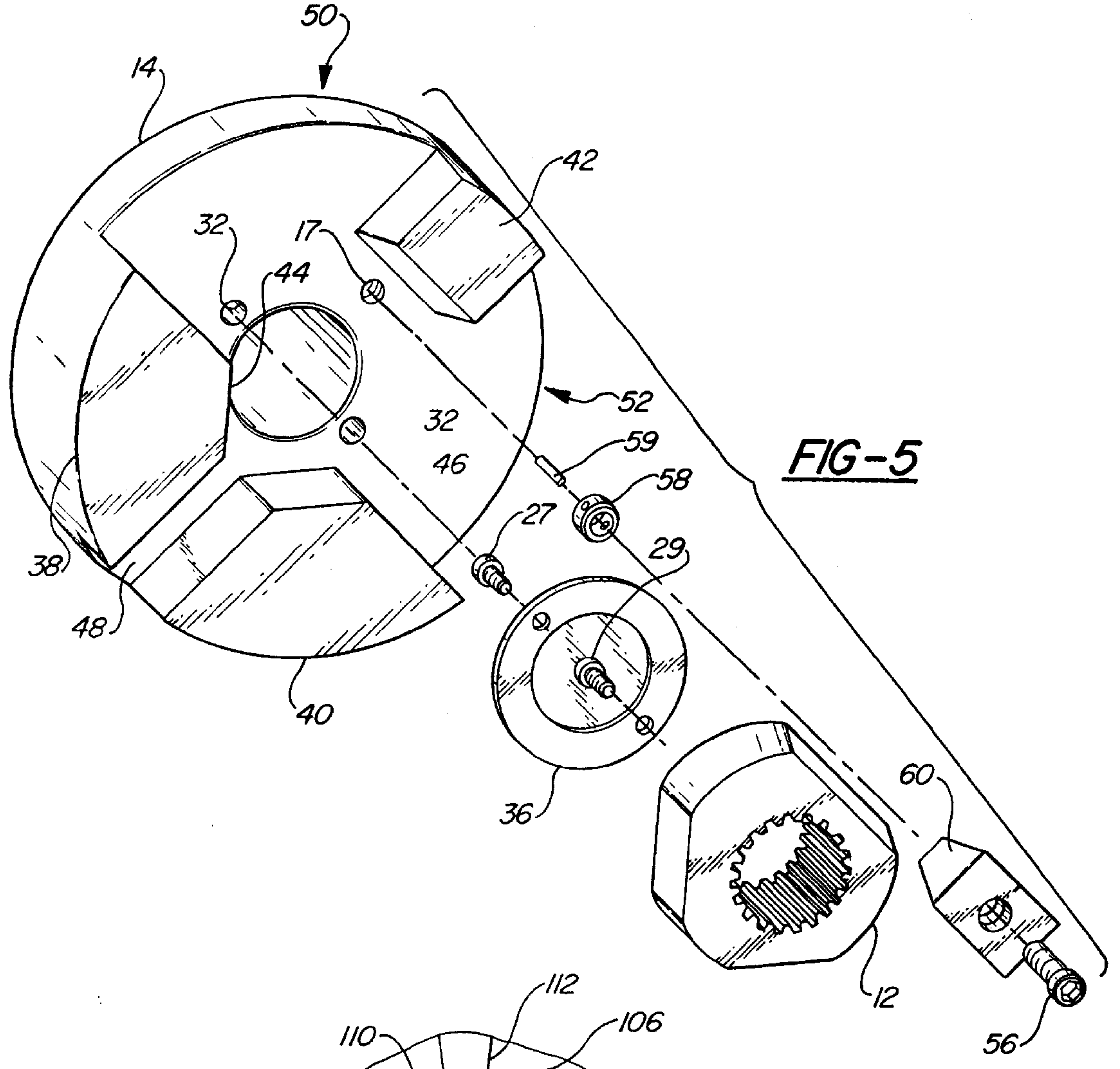
FIG. 5 is an exploded perspective view of the retention apparatus of the preferred embodiment.

The height of the cutting tool with respect to the tool holder may be adjusted by risers 36 which will hereinafter be described in detail. The riser is mounted directly to the bottom of the cutting tool 12. As shown in FIG. 5, cap screws 27 and 29 attach the risers to the cutting tool 12. The heads of the mounting members or cap screws 27 and 29 protrude from the bottom of the cutting tool 12 to provide a fool proof mounting of the cutting tool 12 to its appropriate tool holder 14. The heads of the cap screws 27 and 29 fit into pilot holes 32 in the tool holder 14 as is more clearly depicted in FIG. 2. Since more than one (often six) cutting tool 12 is used in the manufacturing of a spline on a shaft, it is desirable to provide a fool proof system that allows each cutting tool 12 to be installed only in its proper tool holder 14. Such an arrangement is accomplished by locating the mounting members or cap screws 27 and 29 at unique radial positions on each of the various cutting tools 12 such that only the comparable tool holder will allow the correct cutting tool 12 to be mounted to it since the heads of the cap screws 27 and 29 are required to nest with the pilot holes in the tool holder 14.

Figure 2:
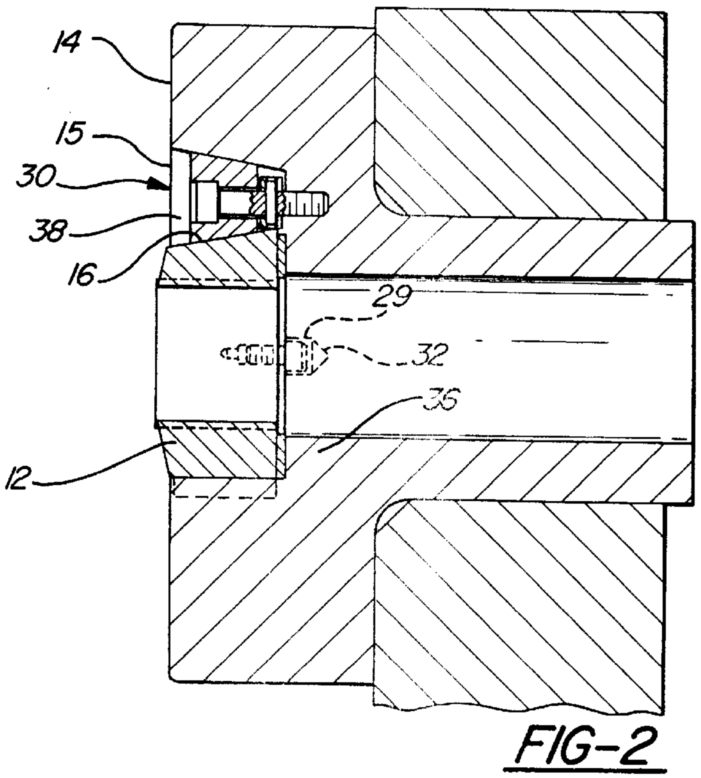
FIG. 2 is a cross-sectional view of the retention apparatus along lines 2—2 of FIG. 3.

Referring to FIG. 2, a cross-sectional view of the tool holder 14 with the cutting tool mounted thereto is shown. FIG. 2 illustrates additional features not clearly shown in FIG. 1 which include the wedge lock arrangement 30, the pilot hole 32, the cap screw 29 and the riser 36. The wedge lock arrangement 30 is shown and will be described in more detail with respect to FIG. 4. The wedge lock arrangement 30 applies a force to the beveled planar face 16 of the cutting tool 12. This force holds the cutting tool 12 against the riser 36 as well as pushes the cutting tool 12 into the flat faces 18 and 20 of the tool holder 14 shown in FIG. 1. The riser 36 is chosen from a set of risers of various heights. The riser 36 adjusts the height of the cutting tool 12 by raising the cutting tool 12 a distance equal to the height of the riser 36. Since the riser 36 is chosen from a set of risers having various heights, the height of the cutting tool 12 can be adjusted as needed. This adjustment is required since the height of the cutting tool 12 is reduced each time the cutting tool 12 is sharpened. The amount of metal removed during sharpening is compensated by increasing the thickness of the riser 36 such that the top surface of the cutting tool 12 is always located the same predetermined distance from the base of the tool holder 14 upon which it is mounted.

The positioning of the heads of the cap screws 27 and 29 in relation to the "V" notch 110 so as to provide a positioning safety for cutters and holders is not new. However, the risers 36 in prior art applications most often had to be made special for each holder/cutter arrangement due to the fact that the "V" locator 112 extended into the cutter body 102 to such an extent that the "V" locator 112 interfered with the riser 36 and a clearance notch larger than the "V" locator 112 was required in the riser 36. The location of the clearance notch in the riser is in direct relationship to the clearance holes in the riser for the cap screws 27 and 29 and therefore a particular riser 36 was required for each different cutter.

The invention further reduces the cost of overall tooling due to the fact that, since the "V" locator 112 is no longer utilized in the invention, the riser 36 can be cylindrical in shape without a clearance notch and, by placing the clearance holes for the cap screw retainers 27 and 29 in the riser 36 in a fixed relationship to each other, one riser 36 can be used for all configurations of cutting the tool 12 and the tool holder 14 within a set of tools. Only the radial positioning of the fixed pattern for the cap screws 27 and 29 in relationship to the flats 24 and 26 need be utilized for cutter/holder positioning safety.

Figure 3:
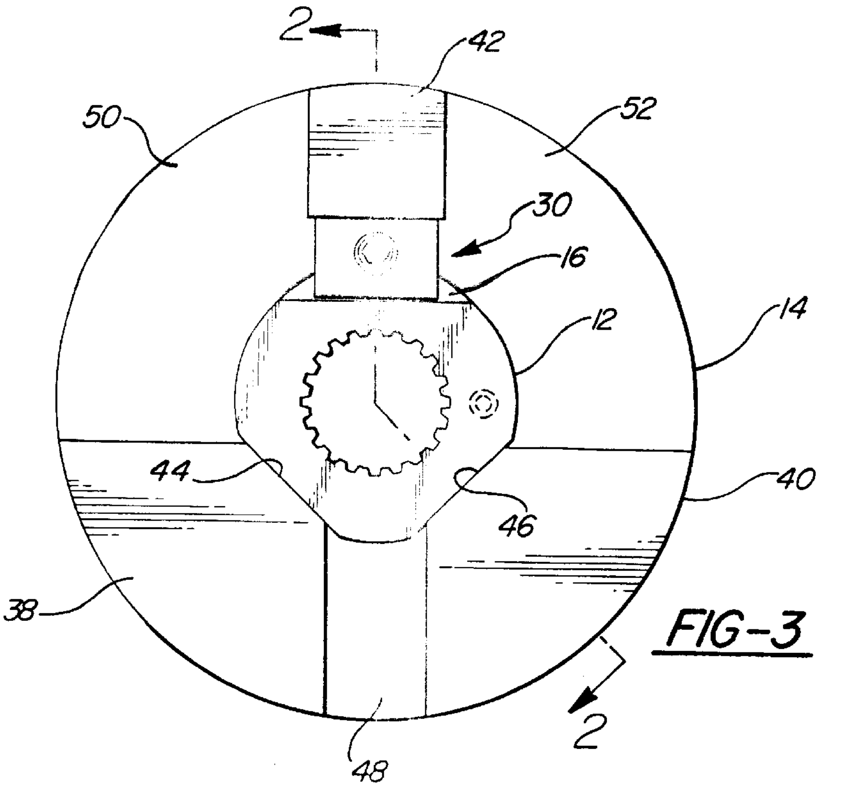
FIG. 3 is a plan view of the preferred embodiment of the present invention.

Referring now to FIGS. 3 and 5, the preferred embodiment of the present invention is shown. The tool holder 14 is modified to include three riser blocks 38, 40 and 42 to receive the cutting tool 12. The riser block 38 has a first abutment face 44, which is a precision ground edge, and a second abutment face 46 of the riser 40 also has a precision ground edge. Unlike the embodiment of FIG. 1, the preferred embodiment of FIGS. 3 and 5 provides an open segment 48 between the riser block 38 and the riser block 40 as well as two large arc-segment portions 50 and 52 between the riser block 38 and the riser block 40 and the riser block 42. These open segments 48, 50, and 52 provide easy access to the cutting tool 12 for removal of the cutting tool as well as allow shavings created when forming the part to be moved away from the cutting tool 12. The ability to easily remove metal shavings reduces the potential of having to disassemble the tool holder 14 to remove the metal shavings. A wedge lock arrangement is shown which is similar to the wedge lock arrangement 30 shown in FIG. 1.

FIG. 4 shows an enlarged detailed cross-sectional view of the wedge lock arrangement 30. The wedge lock arrangement 30 includes a wedge member 60 having a first tapered edge 61, a second tapered edge 62, a threaded collar 58 having a cross pin 59, and a retaining screw 56. In assembly, the threaded collar 58 is threaded onto the retaining screw 56 to a predetermined location after the threaded screw is mounted through a hole 63 in the wedge member 60. The cross pin 59 is then mounted in a hole 65 made in the threaded collar 58 as well as in the retaining screw 56. After the threaded collar is in place the complete wedge lock arrangement 30 is then screwed into a threaded hole 17 made in the base of the tool holder 14 until the tapered edges 61 and 62 come into contact with the complementary tapered edges 15 and 16 of the respective cutting tool 12 and the riser block 42. Note that when the wedge lock arrangement is in place holding the cutting tool 12 to its tool holder 14 the threaded collar 58 does not contact either the tool holder 14, cutting tool 12, or the wedge member 60 since the collar has no function during the locking of the cutting tool 12 to the tool holder 14. However, when the cutting tool 12 is to be removed from its tool holder 14 the retaining screw 56 is turned counterclockwise to remove it from its threaded hole 17 in the tool holder 14. Because of the functional engagement of the first and second tapered edges 61 and 62 with the tapered surfaces on the cutting tool 12 and the riser block 42, the wedge member will remain in its locked position until the retaining screw 56 is sufficiently backed off and the threaded collar 58 comes into contact with the bottom surface of the wedge member 60. As the retaining screw 56 is further turned counterclockwise to remove it from the tool holder, the threaded collar 58 now provides a lifting force to the wedge member 60 to overcome the residual frictional forces holding the wedge member 60 in place. Upon breaking away from its locked position the wedge member 60, retaining screw 56, threaded collar 58, and cross pin 59 are removed from the cavity 28 and the cutting tool 12 may be removed from its holder.

An optional configuration of the wedge lock arrangement 30 is to make the tapered edge 61 parallel to the axis of the retaining screw 56. While this configuration would be functional, it does not provide as great a holding force as the wedge lock arrangement 30 wherein both edges are tapered. By having both edges tapered, the wedge lock arrangement 30 will provide approximately twice the holding force to hold the cutting tool 12 to its tool holder 14. One skilled in the art may appreciate the use of other wedge locking configurations to mount the cutting tool 12 to the tool holder 14.

Figure 6:
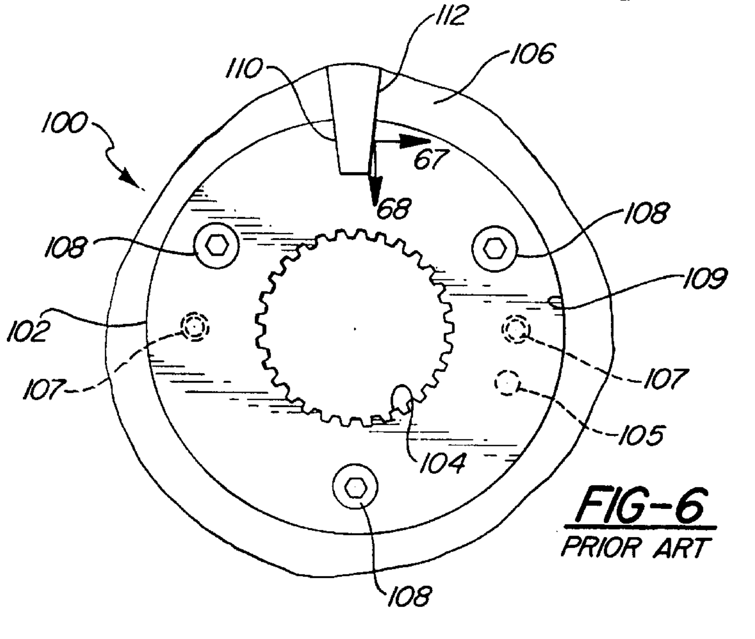
FIG-6 PRIOR ART
FIG. 6 is a plan view of a known prior art cutting tool mounted to the top of a tool holder.

It should be appreciated that the wedge lock arrangement 30 applies forces across the cross section of the cutting tool 12. The direction of these forces is shown by force direction arrows 64 and 66 in FIG. 4. In contrast, the direction of force illustrated by arrows 67 and 68 in the prior art device depicted in FIG. 6 is in a direction outward from the "V" notch 110. Experience has shown that this outward type force tends to induce premature failure of the cutting tool 12.

As a result of the configuration of the tool holder 14 shown in FIGS. 1 through 5, accuracy in positioning the cutting tool 12 is improved because the clearance between the mounting block hole and the cutting tool, as shown in the prior art, is eliminated. Radial positioning is also more positive because the securing mechanism of the wedge lock arrangement 30 does not limit the accuracy by which the cutting tool 12 is positioned relative to the tool holder 14.

The cutting tool 12 is easy to remove because when the retaining screw 56 of the wedge lock arrangement 30 is backed off, the cavity 28 provides a clearance which allows free removal of the cutting tool 12. This is in sharp contrast with the prior art method that often requires jack screws to remove the cutter body from the precision hole.

Only one retaining device is required to hold the cutting tool 12 in place. This is in contrast to the prior art which requires a plurality of socket head screws in addition to a radial positioning device to hold a cutting tool in place. By reducing the number of parts necessary to secure the cutting tool 12 to a single wedge lock arrangement 30, the time and effort required to change tools is greatly reduced. The typical time required to change a cutting tool in the prior art method is approximately 10 to 15 minutes. The time necessary to change the cutting tool in the present invention is 1 to 3 minutes. Furthermore, with the embodiment shown in FIG. 3, the metal shavings produced from cutting the part can be removed from the holder without having to disassemble the cutting tool 12 from its tool holder 14. This "in-place" cleaning simply was not possible with the prior art. Since the retaining screw holes of prior art cutters have been eliminated, the cutter made according to the invention is less expensive to manufacture.

It is readily clear to a person skilled in the art that the preferred embodiment of the present invention can be reworked into existing cutters without having to replace the cutter body.

Since the "V" locator of the prior art has been eliminated, the need for different sharpening riser shims for each cutter detail in a set of tools has been removed and results in significant reduction of the overall tooling cost. A single riser design will fit all the cutters in a set. This significantly reduces the number of risers required to successfully operate a complete machining center.

Many modifications and variations of the present invention are possible in light of the above teachings. Therefore, within the scope of the appended claims, the present invention may be practiced other than as specifically described.

What is claimed is:

1. A method of retaining a broach cutting tool member in a broach tool holder, said broach tool holder comprising:

a top surface, an oppositely disposed bottom surface, and an intermediate surface interposed said top and bottom surfaces, said broach tool holder further comprising a first planar abutment surface extending from said top surface, a second planar abutment surface extending from said top surface and spaced a predetermined distance from said first planar abutment surface, said first planar abutment surface and said second planar abutment surface forming a dihedral right angle, said first and second planar abutment surfaces further forming a right angle with said top surface;

said broach cutting tool member comprising a bottom end surface, a top end surface opposite said bottom end surface, a peripheral outer surface interposed said top end surface and said bottom end surface, said peripheral outer surface having two planar abutment surfaces disposed along said peripheral outer surface and extending perpendicularly to said top end surface and said bottom end surface of said broach cutting tool member, said two planar abutment surfaces adapted to be complementary, respectively, to said first planar and second planar abutment surfaces, disposed on said broach tool holder, said peripheral outer surface of said broach cutting tool member further having a third planar abutment surface disposed along said peripheral outer surface, said third planar abutment surface having at least a portion extending obliquely with respect to one of said top end surface and said bottom end surface of said broach cutting tool member;

said method comprising the steps of positioning said two planar abutment surfaces of said broach cutting tool member contiguous said first planar and said second planar abutment surfaces, respectively, of said broach tool holder and simultaneously locating said bottom end surface of said broach cutting tool member on said intermediate surface of said broach tool holder whereby when said broach cutting tool member is positioned in said broach tool holder a predetermined accurate work position is established for said broach cutting tool member; and locking said broach cutting tool member in said predetermined accurate work position, by imposing a locking force on said at least a portion of said third planar abutment surface of said broach cutting tool member, said locking force having a force component directed towards said two planar abutment surfaces of said broach cutting tool member and a force component directed downward from said top surface towards said intermediate surface of said broach tool holder to securely hold said broach cutting tool member in said broach tool holder.

2. The method as claimed in claim 1 further comprising the step of placing a riser on said intermediate surface prior to positioning said broach cutting tool member on said broach tool holder.

3. A method of retaining a broach cutting tool member in a broach tool holder, one of said broach cutting tool member and said broach tool holder having a first top surface and a second lower surface spaced from said first top surface, said method comprising the steps of:

forming a first planar surface on one of said broach cutting tool member and said broach tool holder;

forming a second planar surface on said one of said broach cutting tool member and said broach tool holder, said second planar surface being placed a predetermined circumferential distance from said first planar surface so as to form a dihedral angle therebetween;

forming complementary first and second planar surfaces on the other of said broach cutting tool member and said broach tool holder;

each of said first and second planar surfaces of said one and said other of said broach cutting tool member and said broach tool holder being placed in a direction extending substantially transversely to said first top surface of said one of said broach cutting tool member and said broach tool holder;

placing a third planar surface on one of said broach cutting tool member and said broach tool holder, said third planar surface being spaced from said first and second planar surfaces on said one and said other of said broach cutting tool member and said broach tool holder, at least a portion of said third planar surface being placed at an oblique angle with respect to said first top surface of said one of said broach cutting tool member and said broach tool holder;

positioning said first and second planar surfaces on said one of said broach cutting tool member and said broach tool holder contiguous to said respective complementary first and second planar surfaces on said other of said broach cutting tool member and said broach tool holder whereby when said one of said broach cutting tool member and said broach tool holder is positioned contiguous to said other of said broach cutting tool member and said broach tool holder a predetermined accurate work position is established; and locking said one of said broach cutting tool member and said broach tool holder in said predetermined accurate work position by imposing a locking force on said at least a portion of said third planar surface whereby said locking force generates a force component in a direction downward from said first top surface towards said second lower surface and a force component towards said first and second planar surfaces of one of said broach cutting tool member and said broach tool holder.

4. The method as claimed in claim 3 further comprising the step of placing a riser on said second lower surface prior to positioning said broach cutting tool member on said broach tool holder.

5. The method as claimed in claim 3 wherein said locking step further comprises placing a threaded member in one of said broach cutting tool member and said broach tool holder whereby one end of said threaded member engages said at least a portion of said third planar surface to impose said locking forces between one of said broach tool holder and said broach cutting tool member.

6. The method as claimed in claim 3 wherein said step of forming said second planar surface on one of said broach cutting tool member and said broach tool holder at a predetermined circumferential distance further comprises placing said second planar surface at substantially a right angle to said first planar surface; and wherein forming said complementary first and second planar surfaces on the other of said broach cutting tool member and said broach tool holder further comprises placing said first planar surface at a substantially right angle to said second planar surface on said other of said broach cutting tool member and said broach tool holder.

7. The method as claimed in claim 3 wherein said locking step comprises placing a wedging member between said broach cutting tool member and said broach tool holder whereby a portion of said wedging member engages said at least a portion of said third planar surface to impose said locking force between said broach cutting tool member and said broach tool holder.

8. The method as claimed in claim 3 wherein said steps of forming said first and second planar surfaces comprise forming said first and second planar surfaces on an external peripheral surface of said broach cutting tool member, and further wherein said step of forming said complementary first and second planar surfaces comprises forming said complementary first and second planar surfaces on an internal peripheral surface of said broach tool holder to facilitate use of said broach cutting tool member for producing products with external features formed from said broach cutting tool member.

9. The method as claimed in claim 3 wherein said steps of forming said first and second planar surfaces comprise forming said first and second planar surfaces on an internal peripheral surface of said broach cutting tool member, and further wherein said step of forming said complementary first and second planar surfaces comprises forming said complementary first and second planar surfaces on an external peripheral surface of said broach tool holder to facilitate use of said broach cutting tool member for producing products with internal features formed from said broach cutting tool member.

* * * * *

UNITED STATES PATENT AND TRADEMARK OFFICE

CERTIFICATE OF CORRECTION

PATENT NO. : 6,256,857 B1
DATED : July 10, 2001
INVENTOR(S) : Roseliep

It is certified that error appears in the above-identified patent and that said Letters Patent is hereby corrected as shown below:

Column 5,
Line 30, delete "cutting the" and insert -- the cutting --.

Column 7,
Line 49, delete the comma ",".

Column 8,
Line 25, delete "placed" and insert -- formed --.
Line 35, delete "placed" and insert -- formed --.
Line 39, delete "placing" and insert -- forming --.

Signed and Sealed this

Twenty-ninth Day of January, 2002

*Attest:*

JAMES E. ROGAN

*Attesting Officer*

*Director of the United States Patent and Trademark Office*

UNITED STATES PATENT AND TRADEMARK OFFICE

CERTIFICATE OF CORRECTION

PATENT NO. : 6,256,857 B1
DATED : July 10, 2001
INVENTOR(S) : Roseliep

It is certified that error appears in the above-identified patent and that said Letters Patent is hereby corrected as shown below:

Column 1,
Line 4, delete a period "." after "5,878,642" and insert -- ,which in turn is a file wrapper continuation of application Serial No. 08/692,614, filed August 6, 1996, which in turn is a file wrapper continuation of application Serial No. 08/301,292, filed September 6, 1994. --

Signed and Sealed this

Second Day of July, 2002

Attest:

JAMES E. ROGAN

*Attesting Officer* *Director of the United States Patent and Trademark Office*